(12) United States Patent
Liu et al.

(10) Patent No.: US 8,459,469 B2
(45) Date of Patent: Jun. 11, 2013

(54) POLYBENZOXAZOLE MEMBRANES PREPARED FROM AROMATIC POLYAMIDE MEMBRANES

(75) Inventors: Chunqing Liu, Schaumburg, IL (US); Raisa Minkov, Skokie, IL (US); Syed A. Faheem, Huntley, IL (US); Man-Wing Tang, Cerritos, CA (US); Lubo Zhou, Inverness, IL (US); Jeffery C. Bricker, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 414 days.

(21) Appl. No.: 12/879,244

(22) Filed: Sep. 10, 2010

(65) Prior Publication Data

US 2010/0331437 A1 Dec. 30, 2010

Related U.S. Application Data

(63) Continuation-in-part of application No. 12/491,473, filed on Jun. 25, 2009, now abandoned.

(51) Int. Cl.
*B01D 71/62* (2006.01)
*B01D 71/68* (2006.01)
*B01D 71/38* (2006.01)

(52) U.S. Cl.
USPC ............ 210/500.39; 210/500.21; 210/500.41; 427/487; 427/243

(58) Field of Classification Search
None
See application file for complete search history.

(56) References Cited

U.S. PATENT DOCUMENTS

| | | | |
|---|---|---|---|
| 3,133,132 A | 5/1964 | Loeb et al. |
| 4,230,463 A | 10/1980 | Henis et al. |
| 4,717,393 A | 1/1988 | Hayes |
| 4,847,350 A | 7/1989 | Harris |
| 4,855,048 A | 8/1989 | Tang et al. |
| 4,877,528 A | 10/1989 | Friesen et al. |
| 5,409,524 A | 4/1995 | Jensvold et al. |
| 5,679,131 A | 10/1997 | Obushenko |
| 5,749,943 A | 5/1998 | Shimazu et al. |
| 5,837,032 A | 11/1998 | Moll et al. |
| 6,368,382 B1 | 4/2002 | Chiou |
| 6,500,233 B1 | 12/2002 | Miller et al. |
| 6,626,980 B2 | 9/2003 | Hasse et al. |
| 6,663,805 B1 | 12/2003 | Ekiner et al. |
| 6,896,717 B2 | 5/2005 | Pinnau et al. |
| 6,955,712 B2 | 10/2005 | Yoon |
| 7,048,846 B2 | 5/2006 | White et al. |
| 7,052,793 B2 | 5/2006 | Formato et al. |
| 7,166,146 B2 | 1/2007 | Miller et al. |
| 7,485,173 B1 | 2/2009 | Liu et al. |
| 2003/0150795 A1 | 8/2003 | Dorgan et al. |
| 2004/0050250 A1 | 3/2004 | Pinnau et al. |
| 2004/0097695 A1 | 5/2004 | Yoon |
| 2005/0268782 A1 | 12/2005 | Kulkarni et al. |
| 2006/0138042 A1 | 6/2006 | Okamoto et al. |
| 2007/0022877 A1 | 2/2007 | Marand et al. |
| 2008/0290022 A1* | 11/2008 | Sanchez et al. .......... 210/500.33 |
| 2008/0300336 A1 | 12/2008 | Liu et al. |
| 2009/0114089 A1 | 5/2009 | Liu et al. |
| 2009/0277327 A1 | 11/2009 | Zhou et al. |
| 2009/0277837 A1 | 11/2009 | Liu et al. |
| 2009/0297850 A1* | 12/2009 | Jung et al. ..................... 428/398 |
| 2010/0133171 A1 | 6/2010 | Liu et al. |
| 2010/0133186 A1 | 6/2010 | Liu et al. |
| 2010/0133187 A1 | 6/2010 | Liu et al. |
| 2010/0133188 A1 | 6/2010 | Liu et al. |
| 2010/0133192 A1 | 6/2010 | Liu et al. |
| 2010/0137124 A1 | 6/2010 | Liu et al. |
| 2010/0242723 A1 | 9/2010 | Liu et al. |
| 2010/0243567 A1 | 9/2010 | Liu et al. |
| 2010/0326913 A1 | 12/2010 | Liu et al. |
| 2011/0072973 A1 | 3/2011 | Liu et al. |
| 2011/0077312 A1 | 3/2011 | Liu et al. |
| 2012/0276300 A1 | 11/2012 | Liu et al. |

FOREIGN PATENT DOCUMENTS

| | | |
|---|---|---|
| GB | 2211193 A | 6/1989 |
| JP | 2004231875 A | 8/2004 |
| KR | 100782959 B1 | 11/2007 |
| WO | 9116123 A1 | 10/1991 |

OTHER PUBLICATIONS

U.S. Appl. No. 13/165,939, filed Jun. 22, 2011, Liu et al.
Barsema, "Intermediate polymer to carbon gas separation membranes based on Matrimid PI", Journal of Membrane Science 238 (2004) 93-102.
Dybtsev, "Rigid and Flexible: A Highly Porous Metal-Organic Framework with Unusual Guest-Dependent Dynamic Behavior", Angew, Chem. Int. Ed. 2004, 43, 5033-5036.
Hsiao, "A new class of aromatic polybenzoxazoles containing ortho-phenylenedioxy groups", European Polymer Journal 40 (2004) 1127-1135.

(Continued)

*Primary Examiner* — Krishnan S Menon
(74) *Attorney, Agent, or Firm* — Mark Goldberg

(57) ABSTRACT

The present invention discloses high performance polybenzoxazole membranes prepared from aromatic poly(o-hydroxy amide) membranes by thermal cyclization and a method for using these membranes. The polybenzoxazole membranes were prepared by thermal treating aromatic poly (o-hydroxy amide) membranes in a temperature range of 200° to 550° C. under inert atmosphere. The aromatic poly (o-hydroxy amide) membranes used for making the polybenzoxazole membranes were prepared from aromatic poly(o-hydroxy amide) polymers comprising pendent phenolic hydroxyl groups ortho to the amide nitrogen in the polymer backbone. In some embodiments of the invention, the polybenzoxazole membranes may be subjected to an additional crosslinking step to increase the selectivity of the membranes. These polybenzoxazole membranes showed significantly improved permeability for gas separations compared to the precursor aromatic poly(o-hydroxy amide) membranes and are not only suitable for a variety of liquid, gas, and vapor separations, but also can be used in catalysis and fuel cells.

8 Claims, No Drawings

OTHER PUBLICATIONS

Kim, "Gas permeation properties of polybenzoxazole membranes derived from the thermal rearrangement of poly (hydroxy amide)", The Membrane Society of Korea, 2007 Fall Conference, pp. 129-132.

Park, "Polymers with Cavities Tuned for Fast Selective Transport of Small Molecules and Ions", Science, vol. 318, Oct. 12, 2007, pp. 254-258.

Tullos, "Thermal Conversion of Hydroxy-Containing Imides to Benzoxazoles: Polymer and Model Compound Study", Macromolecules 1999, 32, 3598-3612.

Yaghi, "Metal-organic frameworks: a new class of porous materials", Microporous and Mesoporous Materials 73 (2004) 3-14.

Yaghi, "Systematic Design of Pore Size and Functionality in Isoreticular MOFs and Their Application in Methane Storage", Science, vol. 295, Jan. 18, 2002, pp. 469-472.

Park, "Polymers with Cavities Tuned for Fast Selective Transport of Small Molecules and Ions", Science 318, 254 (2007).

U.S. Appl. No. 13/329,365, filed Dec. 19, 2011, Liu et al.

* cited by examiner

POLYBENZOXAZOLE MEMBRANES PREPARED FROM AROMATIC POLYAMIDE MEMBRANES

CROSS-REFERENCE TO RELATED APPLICATION

This application is a Continuation-In-Part of copending application Ser. No. 12/491,473 filed Jun. 25, 2009, the contents of which are hereby incorporated by reference in its entirety.

BACKGROUND OF THE INVENTION

This invention pertains to high performance polybenzoxazole membranes prepared from aromatic poly(o-hydroxy amide) membranes by thermal cyclization and the method for using these membranes. In some embodiments of the invention, the polybenzoxazole membranes may be subjected to an additional crosslinking step to increase the selectivity of the membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams. For example, UOP's Separex™ cellulose acetate polymeric membrane is currently an international market leader for carbon dioxide removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and high selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, good permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through glassy polymers more slowly as compared to polymers with less stiff backbones. However, polymers which are more permeable are generally less selective than less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success. In addition, traditional polymer membranes also have limitations in terms of thermal stability and contaminant resistance.

Cellulose acetate (CA) glassy polymer membranes are used extensively in gas separation. Currently, such CA membranes are used commercially for natural gas upgrading, including the removal of carbon dioxide. Although CA membranes have many advantages, they are limited in a number of properties including selectivity, permeability, and in chemical, thermal, and mechanical stability. It has been found that polymer membrane performance can deteriorate quickly. A primary cause of loss of membrane performance is liquid condensation on the membrane surface. Condensation can be prevented by providing a sufficient dew point margin for operation, based on the calculated dew point of the membrane product gas. UOP's MemGuard™ system, a regenerable adsorbent system that uses molecular sieves, was developed to remove water as well as heavy hydrocarbons from the natural gas stream, hence, to lower the dew point of the stream. The selective removal of heavy hydrocarbons by a pretreatment system can significantly improve the performance of the membranes. Although these pretreatment systems can effectively perform this function, the cost is quite significant. In some projects, the cost of the pretreatment system was as high as 10 to 40% of the total cost (pretreatment system and membrane system) depending on the feed composition. Reduction of the size of the pretreatment system or even total elimination of the pretreatment system would significantly reduce the membrane system cost for natural gas upgrading. Another factor is that, in recent years, more and more membrane systems have been installed in large offshore natural gas upgrading projects. The footprint is a big constraint for offshore projects. The footprint of the pretreatment system is very high at more than 10 to 50% of the footprint of the whole membrane system. Removal of the pretreatment system from the membrane system has great economic impact, especially to offshore projects.

High-performance polymers such as polyimides (PIs), poly(trimethylsilylpropyne) (PTMSP), and polytriazole have been developed to improve membrane selectivity, permeability, and thermal stability. These polymeric membrane materials have shown promising properties for separation of gas pairs such as $CO_2/CH_4$, $O_2/N_2$, $H_2/CH_4$, and propylene/propane ($C_3H_6/C_3H_8$). However, current polymeric membrane materials have reached a limit in their productivity-selectivity trade-off relationship. In addition, gas separation processes based on the use of glassy solution-diffusion membranes frequently suffer from plasticization of the polymer matrix by the sorbed penetrant molecules such as $CO_2$ or $C_3H_6$. Plasticization of the polymer as demonstrated by membrane structure swelling and significant increases in the permeabilities of all components in the feed occurs above the plasticization pressure when the feed gas mixture contains condensable gases.

Aromatic polybenzoxazoles (PBDs), polybenzothiazoles (PBTs), and polybenzimidazoles (PBIs) are highly thermally stable ladderlike glassy polymers with flat, stiff, rigid-rod phenylene-heterocyclic ring units. The stiff, rigid ring units in such polymers pack efficiently, leaving very small penetrant-accessible free volume elements that are desirable to provide polymer membranes with both high permeability and high selectivity. These aromatic PBO, PBT, and PBI polymers, however, have poor solubility in common organic solvents, preventing them from being used for making polymer membranes by the most practical solvent casting method.

Thermal conversion of soluble aromatic polyimides containing pendent functional groups ortho to the heterocyclic imide nitrogen in the polymer backbone to aromatic polybenzoxazoles (PBDs) or polybenzothiazoles (PBTs) has been found to provide an alternative method for creating PBO or PBT polymer membranes that are difficult or impossible to obtain directly from PBO or PBT polymers by solvent casting method. (Tullos et al, MACROMOLECULES, 32, 3598 (1999)) A recent publication in the journal SCIENCE reported high permeability polybenzoxazole polymer membranes for gas separations (Ho Bum Park et al, SCIENCE 318, 254 (2007)). These polybenzoxazole membranes are prepared from high temperature thermal rearrangement of hydroxy-containing polyimide polymer membranes containing pendent hydroxyl groups ortho to the heterocyclic imide nitrogen. These polybenzoxazole polymer membranes exhibited extremely high $CO_2$ permeability (>1000 Barrer) which is about 100 times better than conventional polymer membranes. Polybenzoxazole membranes prepared from high temperature thermal rearrangement of polyimide membranes are more brittle and have lower mechanical stability than the conventional polyimide membranes. Therefore, development of polybenzoxazole membranes with high performance and good mechanical stability from new alternative polybenzoxazole precursor membranes is highly desirable for commercial separation applications.

Poly(o-hydroxy amide) polymers comprising pendent phenolic hydroxyl groups ortho to the amide nitrogen in the polymer backbone have been used for making photosensitive polybenzoxazoles as insulating materials in microelectronic industry by thermal cyclization at high temperature. See Shibasaki et al., POLYMER JOURNAL, 39, 81 (2007); Toyokawa et al., JOURNAL OF POLYMER SCIENCE: PART A: POLYMER CHEMISTRY, 43, 2527 (2005). However, this type of poly(o-hydroxy amide) polymers has not been used for making polybenzoxazole membranes for separation applications.

The present invention provides a process of making polybenzoxazole membranes from poly(o-hydroxy amide) polymer membranes that have the following properties and advantages: ease of processability, high mechanical stability, high selectivity, high permeance, stable permeance and sustained selectivity over time by resistance to solvent swelling, plasticization and hydrocarbon contaminants.

SUMMARY OF THE INVENTION

This invention pertains to high performance polybenzoxazole membranes prepared from aromatic poly(o-hydroxy amide) membranes by thermal cyclization, a method of preparing such membranes as well as a method for using them.

The polybenzoxazole membranes described in the present invention were prepared by thermal cyclization of the aromatic poly(o-hydroxy amide) membranes in a temperature range of 200° to 550° C. under inert atmosphere. These aromatic poly(o-hydroxy amide) membranes were prepared from aromatic poly(o-hydroxy amide) polymers comprising pendent phenolic hydroxyl groups ortho to the amide nitrogen in the polymer backbone. The polybenzoxazole membranes showed more than 100 times higher permeability for gas separations compared to the aromatic poly(o-hydroxy amide) membranes.

In another embodiment of the invention, the polybenzoxazole membranes prepared from aromatic poly(o-hydroxy amide) membranes have undergone an additional crosslinking step, by chemical or UV crosslinking or other crosslinking process as known to one skilled in the art. The aromatic polybenzoxazole polymers in the polybenzoxazole membranes may have UV cross-linkable functional groups such as benzophenone groups. The cross-linked polybenzoxazole membranes comprise polymer chain segments where at least part of these polymer chain segments are cross-linked to each other through possible direct covalent bonds by exposure to UV radiation. The cross-linking of the polybenzoxazole membranes provides membranes with superior selectivity and improved chemical and thermal stabilities compared to the corresponding uncross-linked polybenzoxazole membranes.

Polybenzoxazole membranes prepared from aromatic poly(o-hydroxy amide) membranes have the advantages of ease of processability, high mechanical stability, high selectivity, high permeance, stable permeance and sustained selectivity over time by resistance to solvent swelling, plasticization and hydrocarbon contaminants.

The present invention provides a method for the production of high performance polybenzoxazole membrane including the steps of first fabricating an aromatic poly(o-hydroxy amide) membrane from an aromatic poly(o-hydroxy amide) polymer comprising pendent phenolic hydroxyl groups ortho to the amide nitrogen in the polymer backbone, and then converting the aromatic poly(o-hydroxy amide) membrane to a polybenzoxazole membrane by application of heat between 200° and 550° C. under an inert atmosphere, such as argon, nitrogen, or vacuum. In some cases a membrane post-treatment step can be added after the formation of the polybenzoxazole membrane in which the selective layer surface of the polybenzoxazole membrane is coated with a thin layer of high permeability material such as a polysiloxane, a fluoropolymer, a thermally curable silicone rubber, or a UV radiation curable epoxy silicone.

The polybenzoxazole membranes prepared in the present invention can have either a nonporous symmetric structure or an asymmetric structure with a thin selective layer supported on top of a porous support layer. These membranes can be fabricated into any convenient geometry such as flat sheet (or spiral wound), disk, tube, hollow fiber, or thin film composite.

The invention provides a process for separating at least one gas or liquid from a mixture of gases or liquids using the polybenzoxazole membrane prepared from aromatic poly(o-hydroxy amide) membrane. The process comprises providing a polybenzoxazole membrane prepared from aromatic poly(o-hydroxy amide) membrane that is permeable to at least one gas or liquid; contacting the mixture of gases or liquids on one side of the polybenzoxazole membrane to cause at least one gas or liquid to permeate the polybenzoxazole membrane; and removing from the opposite side of the membrane a permeate gas or liquid composition that is a portion of at least one gas or liquid which permeated the membrane.

These polybenzoxazole membranes are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The membranes that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases: such as carbon dioxide from methane, nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including carbon dioxide removal from natural gas and biogas and in enhanced oil recovery.

In 1999, Tullos et al. reported the synthesis of a series of hydroxy-containing polyimide polymers containing pendent hydroxyl groups ortho to the heterocyclic imide nitrogen. These polyimides were found to undergo thermal conversion to polybenzoxazoles upon heating between 350° and 500° C. under nitrogen or vacuum. (Tullos et al, MACROMOLECULES, 32, 3598 (1999)) A recent publication in SCIENCE reported a further study that the polybenzoxazole polymer materials reported by Tullos et al. possessed tailored free volume elements with well-connected morphology. The unusual microstructure in these polybenzoxazole polymer materials can be systematically tailored using thermally-driven segment rearrangement, providing a route for preparing polybenzoxazole polymer membranes for gas separations. See Ho Bum Park et al, SCIENCE, 318, 254 (2007). These polybenzoxazole polymer membranes exhibited extremely high $CO_2$ permeability for $CO_2/CH_4$ separation.

It has now been found that high performance polybenzoxazole membranes prepared from aromatic poly(o-hydroxy amide) membranes by thermal cyclization can be successfully made for use as membranes. In some embodiments of the invention, the polybenzoxazole membranes prepared from aromatic poly(o-hydroxy amide) membranes may be subjected to an additional crosslinking step to increase the selectivity of the membranes.

The polybenzoxazole membranes prepared from aromatic poly(o-hydroxy amide) membranes have the advantages of ease of processability, both high selectivity and high permeation rate or flux, high thermal stability, and stable flux and sustained selectivity over time by resistance to solvent swelling, plasticization and deterioration by exposure to hydrocarbon contaminants.

The polybenzoxazole membranes described in the present invention were prepared by thermal cyclization of the aromatic poly(o-hydroxy amide) membranes in a temperature range of 200° to 550° C. under an inert atmosphere. The aromatic poly(o-hydroxy amide) polymers comprised pendent phenolic hydroxyl groups ortho to the amide nitrogen in the polymer backbone.

The present invention provides a method for the production of high performance polybenzoxazole membranes including: first fabricating an aromatic poly(o-hydroxy amide) membrane from the aromatic poly(o-hydroxy amide) polymer comprising pendent phenolic hydroxyl groups ortho to the amide nitrogen in the polymer backbone, and then converting the aromatic poly(o-hydroxy amide) membrane to a polybenzoxazole membrane by heating it between 200° and 550° C. under an inert atmosphere, such as argon, nitrogen, or a vacuum. In some cases a membrane post-treatment step can be added after the formation of the polybenzoxazole membrane in which the selective layer surface of the polybenzoxazole membrane is coated with a thin layer of high permeability material such as a polysiloxane, a fluoro-polymer, a thermally curable silicone rubber, or a UV radiation curable epoxy silicone.

In some cases, it is desirable to cross-link the polybenzoxazole membrane to improve the membrane selectivity. The cross-linked polybenzoxazole membrane described in the current invention is prepared by UV cross-linking of the polybenzoxazole polymer containing UV crosslinkable functional groups such as benzophenone groups. After UV cross-linking, the cross-linked polybenzoxazole polymer membrane comprises polymer chain segments wherein at least part of these polymer chain segments are cross-linked to each other through possible direct covalent bonds by exposure to UV radiation. The cross-linking of the polybenzoxazole polymer membranes offers the membranes superior selectivity and improved chemical and thermal stabilities than the corresponding uncross-linked polybenzoxazole polymer membranes.

The aromatic poly(o-hydroxy amide) membranes that are used for the preparation of polybenzoxazole membranes described in the present invention are fabricated from soluble aromatic poly(o-hydroxy amide) polymers comprising pendent phenolic hydroxyl groups ortho to the amide nitrogen in the polymer backbones by a solution casting or solution spinning method or other method as known to those of ordinary skill in the art. The thermal cyclization of the aromatic poly(o-hydroxy amide) polymers results in the formation of polybenzoxazole, and is accompanied by a loss of water with no other volatile byproducts being generated. The polybenzoxazole polymers in the polybenzoxazole membranes comprise the repeating units of a formula (I), wherein said formula (I) is:

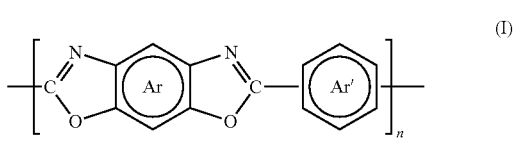

where

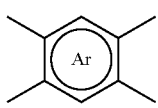

is selected from the group consisting of

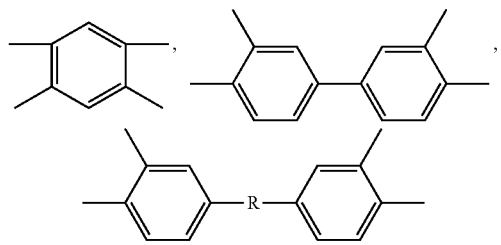

and mixtures thereof, —R— is selected from the group consisting of

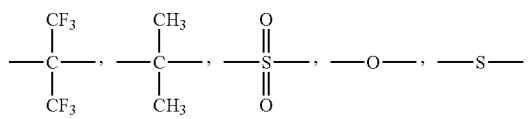

and mixtures thereof, and

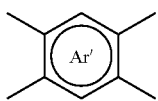

is selected from the group consisting of

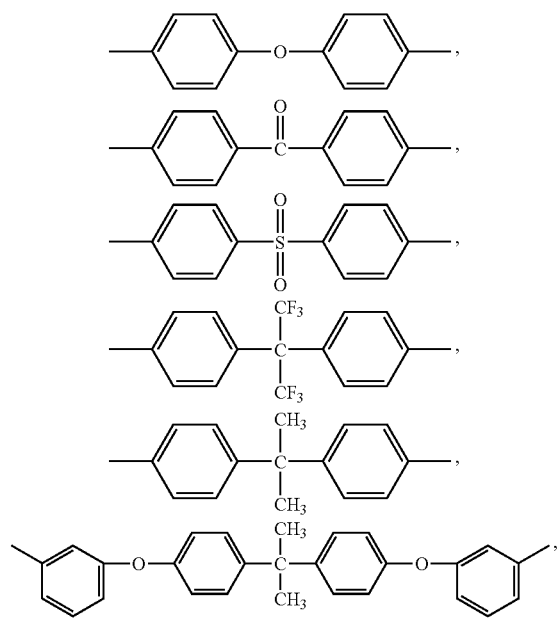

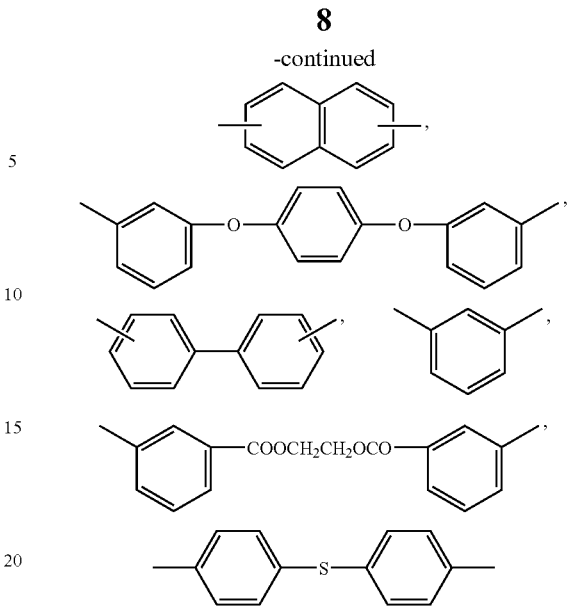

and mixtures thereof.

The aromatic poly(o-hydroxy amide) polymers comprising pendent phenolic hydroxyl groups ortho to the amide nitrogen in the polymer backbones, that are used for the preparation of high performance polybenzoxazole membranes in the present invention comprise a plurality of first repeating units of a formula (II), wherein formula (II) is:

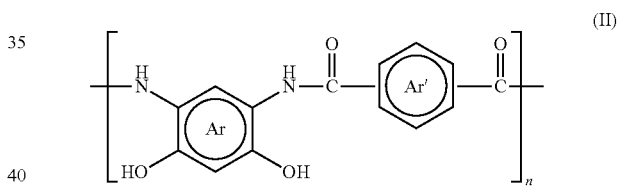

where

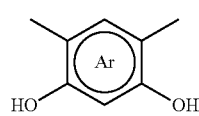

is selected from the group consisting of

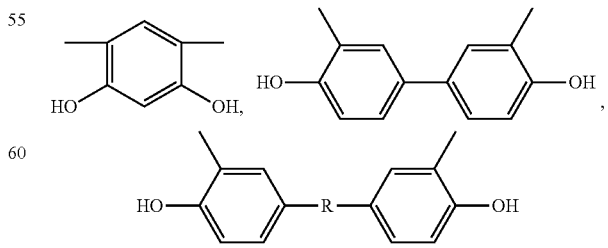

and mixtures thereof, —R— is selected from the group consisting of

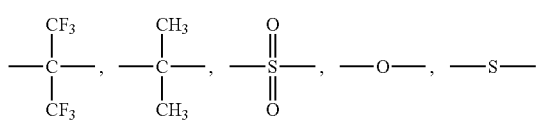

and mixtures thereof, and

is selected from the group consisting of

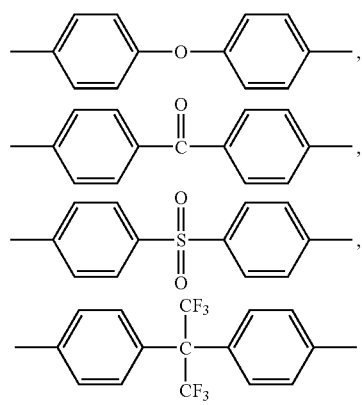

and mixtures thereof

It is preferred that

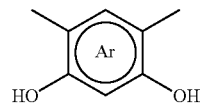

of formula (II) is selected from the group consisting of

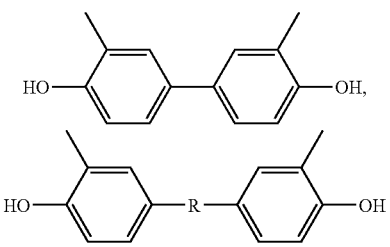

and mixtures thereof, and it is preferred that —R— group is represented by the formula:

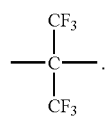

It is preferred that

of formula (II) is selected from the group consisting of and mixtures thereof.

When the polybenzoxazole polymer membrane prepared from the aromatic poly(o-hydroxy amide) polymer membrane is to be subjected to a crosslinking step, it is necessary that the aromatic poly(o-hydroxy amide) polymer in the membrane has cross-linkable functional groups such as UV cross-linkable functional groups. For example, to convert a polybenzoxazole polymer membrane prepared from the aromatic poly(o-hydroxy amide) polymer membrane to a high performance crosslinked polybenzoxazole polymer membrane by UV radiation, the aromatic poly(o-hydroxy amide) polymer that is used should be selected from an aromatic poly(o-hydroxy amide) polymer with formula (II) and possessing UV cross-linkable functional groups such as carbonyl (—CO—) groups, wherein

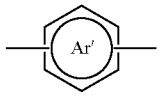

of formula (II) is a moiety having a composition selected from the group consisting of

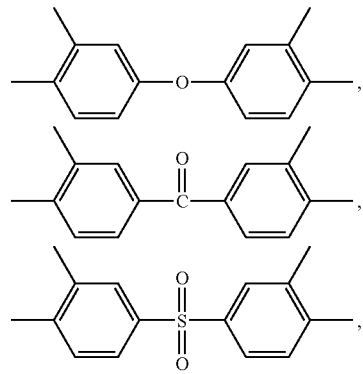

and mixtures thereof.

The preferred aromatic poly(o-hydroxy amide) polymers comprising pendent phenolic hydroxyl groups ortho to the amide nitrogen in the polymer backbones, that are used for the preparation of high performance polybenzoxazole membranes in the present invention include, but are not limited to, poly(o-hydroxy amide) synthesized by polycondensation of 2,2-bis(3-amino-4-hydroxyphenyl)-hexafluoropropane (APAF) with 4,4'-oxydibenzoyl chloride (ODBC) (abbreviated as PA(APAF-ODBC)), poly(o-hydroxy amide) synthesized by polycondensation of 2,2-bis(3-amino-4-hydroxyphenyl)-hexafluoropropane (APAF) with isophthaloyl chloride (IPAC) (abbreviated as PA(APAF-IPAC)), poly(o-hydroxy amide) synthesized by polycondensation of 3,3'-dihydroxy-4,4'-diamino-biphenyl (HAB) with 4,4'-oxydibenzoyl chloride (ODBC) (abbreviated as PA(HAB-ODBC)), poly(o-hydroxy amide) synthesized by polycondensation of 3,3'-dihydroxy-4,4'-diamino-biphenyl (HAB) with isophthaloyl chloride (IPAC) (abbreviated as PA(HAB-IPAC)), and poly(o-hydroxy amide) synthesized by polycondensation of a mixture of 3,3'-dihydroxy-4,4'-diamino-biphenyl (HAB) and 2,2-bis(3-amino-4-hydroxyphenyl)-hexafluoropropane (APAF) with 4,4'-oxydibenzoyl chloride (ODBC) (abbreviated as PA(HAB-APAF-ODBC)).

The preferred polyamide polymers have the following structures:

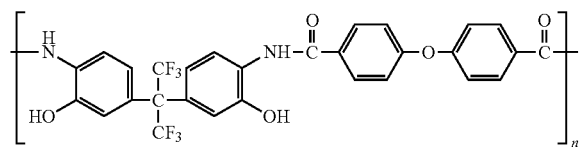

where n is an integer ranging from 15 to 500.

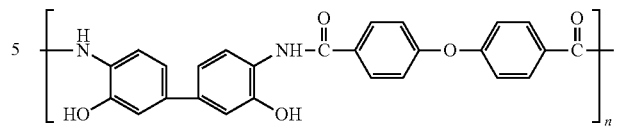

where n is an integer ranging from 15 to 500.

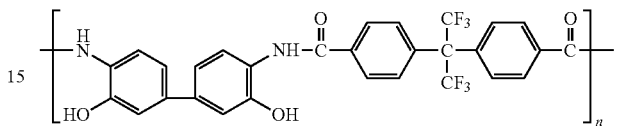

where n is an integer ranging from 15 to 500.

The aromatic poly(o-hydroxy amide) polymers comprising pendent phenolic hydroxyl groups ortho to the amide nitrogen in the polymer backbones are synthesized by polycondensation of diamines with aromatic acid chloride in organic polar solvents such as 1-methyl-2-pyrrolidione (NMP) or N,N-dimethylacetamide (DMAc) by a one-step process. Anhydrous lithium chloride or pyridine is the preferred catalyst for the polycondensation reaction as described in the examples herein. Then, a poly(o-hydroxy amide) membrane is prepared from the aromatic poly(o-hydroxy amide) polymer comprising pendent phenolic hydroxyl groups ortho to the amide nitrogen in the polymer backbone in any convenient form such as a sheet, disk, thin film composite, tube, or hollow fiber. The new polybenzoxazole membrane in the present invention is prepared from thermal cyclization of the aromatic poly(o-hydroxy amide) polymer in the poly(o-hydroxy amide) membrane upon heating between 200° and 550° C. under an inert atmosphere such as nitrogen or vacuum. For example, the polybenzoxazole membranes can be prepared from an aromatic poly(o-hydroxy amide) membrane prepared from PA(APAF-ODBC) polymer via a high temperature heat treatment at 450° C.

The aromatic poly(o-hydroxy amide) membrane that is used for the preparation of high performance polybenzoxazole membrane in the present invention can be fabricated into a membrane with nonporous symmetric thin film geometry from the aromatic poly(o-hydroxy amide) polymer by casting a homogeneous aromatic poly(o-hydroxy amide) solution on top of a clean glass plate and allowing the solvent to evaporate slowly inside a plastic cover for at least 12 hours at room temperature. The membrane is then detached from the glass plate and dried at room temperature for about 24 hours and then at 200° C. for at least 48 hours under vacuum.

The solvents used for dissolving the aromatic poly(o-hydroxy amide) polymer are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of aromatic poly(o-hydroxy amide) membranes, such as N-methylpyrrolidone (NMP) and N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, others known to those skilled in the art and mixtures thereof.

The aromatic poly(o-hydroxy amide) membrane that is used for the preparation of high performance polybenzoxazole membrane in the present invention can also be fabricated by a method comprising the steps of: dissolving the aromatic poly(o-hydroxy amide) polymer in a solvent to form a solution of the aromatic poly(o-hydroxy amide) material; contacting a porous membrane support (e.g., a support made from inorganic ceramic material) with this solution; and then evaporating the solvent to provide a thin selective layer comprising the aromatic poly(o-hydroxy amide) polymer material on the supporting layer.

The aromatic poly(o-hydroxy amide) membrane can be fabricated as an asymmetric membrane with a flat sheet or hollow fiber geometry by phase inversion followed by direct air drying through the use of at least one drying agent which is a hydrophobic organic compound such as a hydrocarbon or an ether (see U.S. Pat. No. 4,855,048). The aromatic poly(o-hydroxy amide) membrane can also be fabricated as an asymmetric membrane with flat sheet or hollow fiber geometry by phase inversion followed by solvent exchange (see U.S. Pat. No. 3,133,132).

The aromatic poly(o-hydroxy amide) polymer membrane is then converted to a polybenzoxazole polymer membrane by heating between 200° and 550° C., preferably from about 350° to 500° C. and most preferably from about 350° to 450° C. under an inert atmosphere, such as argon, nitrogen, or vacuum. The heating time for this heating step is in a range of about 30 seconds to 2 hours. A more preferred heating time is from about 30 seconds to 1 hour.

In some cases a membrane post-treatment step can be added after the formation of the polybenzoxazole polymer membrane with the application of a thin layer of a high permeability material such as a polysiloxane, a fluoro-polymer, a thermally curable silicone rubber, or a UV radiation curable epoxy silicone. The coating filling the surface pores and other imperfections comprising voids (see U.S. Pat. No. 4,230,463; U.S. Pat. No. 4,877,528; and U.S. Pat. No. 6,368,382).

The high performance polybenzoxazole polymer membranes of the present invention can have either a nonporous symmetric structure or an asymmetric structure with a thin nonporous dense selective layer supported on top of a porous support layer. The porous support can be made from the same polybenzothiazole polymer material or a different type of organic or inorganic material with high thermal stability. The polybenzoxazole polymer membranes of the present invention can be fabricated into any convenient geometry such as flat sheet (or spiral wound), disk, tube, hollow fiber, or thin film composite.

The invention provides a process for separating at least one gas or liquid from a mixture of gases or liquids using the polybenzoxazole polymer membranes prepared from aromatic poly(o-hydroxy amide) membranes, the process comprising: (a) providing a polybenzoxazole membrane prepared from aromatic poly(o-hydroxy amide) membrane which is permeable to at least one gas or liquid; (b) contacting the mixture to one side of the polybenzoxazole membrane to cause at least one gas or liquid to permeate the polybenzoxazole membrane; and (c) then removing from the opposite side of the membrane a permeate gas or liquid composition comprising a portion of at least one gas or liquid which permeated the membrane.

These polybenzoxazole membranes prepared from aromatic poly(o-hydroxy amide) membranes are especially useful in the purification, separation or adsorption of a particular species in the liquid or gas phase. In addition to separation of pairs of gases, these polybenzoxazole membranes may, for example, be used for the desalination of water by reverse osmosis or for the separation of proteins or other thermally unstable compounds, e.g. in the pharmaceutical and biotechnology industries. The polybenzoxazole membranes prepared from aromatic poly(o-hydroxy amide) membranes may also be used in fermenters and bioreactors to transport gases into the reaction vessel and transfer cell culture medium out of the vessel. Additionally, the polybenzoxazole membranes prepared from aromatic poly(o-hydroxy amide) membranes may be used for the removal of microorganisms from air or water streams, water purification, ethanol production in a continuous fermentation/membrane pervaporation system, and in detection or removal of trace compounds or metal salts in air or water streams.

The polybenzoxazole membranes prepared from aromatic poly(o-hydroxy amide) membranes of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the polybenzoxazole membranes prepared from aromatic poly(o-hydroxy amide) membranes described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the membranes will range from about −20° to about 100° C., and most preferably, the effective operating temperature will range from about 25° to about 100° C.

The polybenzoxazole membranes are especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these polybenzoxazole membranes may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The polybenzoxazole membranes prepared from aromatic poly(o-hydroxy amide) membranes may incorporate a species that adsorbs strongly to certain gases (e.g. cobalt porphyrins or phthalocyanines for $O_2$ or silver(I) for ethane) to facilitate their transport across the membrane.

The polybenzoxazole membranes can be operated at high temperature to provide the sufficient dew point margin for natural gas upgrading (e.g., $CO_2$ removal from natural gas). The polybenzoxazole membranes can be used in either a single stage membrane or as the first and/or second stage membrane in a two stage membrane system for natural gas upgrading. The polybenzoxazole membranes may be operated without a costly pretreatment system. Hence, a costly membrane pretreatment system such as an adsorbent system would not be required in the new process containing the polybenzoxazole membrane system. Due to the elimination of the pretreatment system and the significant reduction of membrane area, the new process can achieve significant capital cost saving and reduce the existing membrane footprint.

These polybenzoxazole membranes may also be used in the separation of liquid mixtures by pervaporation, such as in the removal of organic compounds (e.g., alcohols, phenols, chlorinated hydrocarbons, pyridines, ketones) from water such as aqueous effluents or process fluids. A polybenzoxazole membrane which is ethanol-selective can be used to increase the ethanol concentration in relatively dilute ethanol solutions (5-10% ethanol) obtained by fermentation processes. Another liquid phase separation example using these polybenzoxazole membranes is the deep desulfurization of gasoline and diesel fuels by a pervaporation membrane process similar to the process described in U.S. Pat. No. 7,048, 846, incorporated herein by reference in its entirety. The polybenzoxazole membranes that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the polybenzoxazole membranes prepared from aromatic poly(o-hydroxy amide) membranes include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The polybenzoxazole membranes may be used for separation of organic molecules from water (e.g. ethanol and/or phenol from water by pervaporation) and removal of metal and other organic compounds from water.

The polybenzoxazole membranes have immediate application for the separation of gas mixtures including carbon dioxide removal from natural gas. The membrane permits carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

The polybenzoxazole membranes also have immediate applications to concentrate olefins in a paraffin/olefin stream for olefin cracking applications. For example, the polybenzoxazole membranes can be used for propylene/propane separation to increase the concentration of the effluent in a catalytic dehydrogenation reaction for the production of propylene from propane and isobutylene from isobutane. Therefore, the number of stages of propylene/propane splitter that is required to get polymer grade propylene can be reduced. Another application for the polybenzoxazole membranes is for separating isoparaffin and normal paraffin in light paraffin isomerization and MaxEne™, a UOP LLC process for enhancing the concentration of normal paraffin (n-paraffin) in a naphtha cracker feedstock, which can be then converted to ethylene.

An additional application of the polybenzoxazole is as the separator in chemical reactors to enhance the yield of equilibrium-limited reactions by selective removal of a specific substance.

In summary, the polybenzoxazole membranes of the present invention are suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations.

EXAMPLES

The following examples are provided to illustrate one or more preferred embodiments of the invention, but are not limited embodiments thereof. Numerous variations can be made to the following examples that lie within the scope of the invention.

Example 1

Synthesis of Aromatic poly(o-hydroxy amide) from 2,2-bis(3-amino-4-hydroxyphenyl)-hexafluoropropane (APAF) and 4,4'-oxydibenzoyl Chloride (ODBC) (Abbreviated as PA(APAF-ODBC))

An aromatic poly(o-hydroxy amide) (abbreviated herein as PA(APAF-ODBC) containing pendent —OH functional groups ortho to the amide nitrogen in the polymer backbone was synthesized by polycondensation of 2,2-bis(3-amino-4-hydroxyphenyl)-hexafluoropropane (APAF) with 4,4'-oxydibenzoyl chloride (ODBC) in NMP polar solvent by a one-step process. Anhydrous lithium chloride (LiCl) was used as the catalyst for the polycondensation reaction. For example, a 250 mL three-neck round-bottom flask equipped with a nitrogen inlet and a mechanical stirrer was charged with 8.0 g of LiCl, 7.32 g of APAF and 100 mL of NMP. Once the APAF was fully dissolved, a solution of ODBC (5.9 g) in 50 mL of NMP was added dropwise to the APAF solution in the flask under mechanical stirring at between −15° and 0° C. The reaction mixture was continuously stirred for 2 hours at −15° to 0° C. and then overnight at room temperature. The resulting viscous polymer solution was poured slowly into 1000 mL of methanol with stirring. The sticky precipitate formed was redissolved in 50 mL of NMP. The NMP solution containing the product was poured slowly into 1000 mL of DI water. The resulting fiberlike precipitate formed was washed repeatedly with water, collected by filtration, and dried at 50° C. for 24 hours in vacuum oven. The yield was almost quantitative.

Example 2

Preparation of Pa(Apaf-Odbc) Polymer Membrane

The PA(APAF-ODBC) polymer membrane was prepared as follows: 7.5 g of PA(APAF-ODBC) poly(o-hydroxy amide) synthesized in Example 1 was dissolved in a solvent mixture of 10.0 g of NMP and 5.0 g of 1,3-dioxolane. The mixture was mechanically stirred for 2 hours to form a homogeneous casting dope. The resulting homogeneous casting dope was allowed to degas overnight. The PA(APAF-ODBC) polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 150° C. under vacuum for at least 48 hours to completely remove the residual solvents to form PA(APAF-ODBC) polymer membrane.

Example 3

Preparation of Polybenzoxazole Polymer Membrane from Pa(Apaf-Odbc) Polymer Membrane at 350° C. (abbreviated as PBO(APAF-ODBC-350C))

The polybenzoxazole polymer membrane PBO(APAF-ODBC-350C) was prepared by thermally heating the PA(APAF-ODBC) polymer membrane prepared in Example 2 from 50° to 350° C. at a heating rate of 3° C./min under $N_2$ flow. The membrane was held for 1 hour at 350° C. and then cooled down to 50° C. at a heating rate of 3° C./min under $N_2$ flow.

Example 4

Preparation of Polybenzoxazole Polymer Membrane from Pa(Apaf-Odbc) Polymer Membrane at 400° C. (abbreviated as PBO(APAF-ODBC-400C))

The polybenzoxazole polymer membrane PBO(APAF-ODBC-400C) was prepared by thermally heating the PA(APAF-ODBC) polymer membrane prepared in Example 2 from 50° to 400° C. at a heating rate of 3° C./min under $N_2$ flow. The membrane was held for 1 hour at 400° C. and then cooled down to 50° C. at a rate of 3° C./min under $N_2$ flow.

Example 5

Preparation of Polybenzoxazole Polymer Membrane from Pa(Apaf-Odbc) Polymer Membrane at 450° C. (abbreviated as PBO(APAF-ODBC-450C))

The polybenzoxazole polymer membrane PBO(APAF-ODBC-450C) was prepared by thermally heating the PA(APAF-ODBC) polymer membrane prepared in Example 2 from 50° to 450° C. at a heating rate of 3° C./min under $N_2$ flow. The membrane was hold for 1 hour at 450° C. and then cooled down to 50° C. at a rate of 3° C./min under $N_2$ flow.

Example 6

$CO_2/CH_4$ Separation Performance of PA(APAF-ODBC), PBO(APAF-ODBC-350C), PBO(APAF-ODBC-400C), and PBO(APAF-ODBC-450C) polymer membranes The PA(APAF-ODBC), PBO(APAF-ODBC-350C), PBO(APAF-ODBC-400C), and PBO(APAF-ODBC-450C) polymer membranes were tested for $CO_2/CH_4$ separation under testing temperatures of 50° and 100° C., respectively (Table 1). It can be seen from Table 1 that all the PBO polymer membranes prepared from PA(APAF-ODBC) polymer membrane have comparable $CO_2/CH_4$ selectivity and much higher $CO_2$ permeability than the PA(APAF-ODBC) polymer membrane. The PBO(APAF-ODBC-450C) polymer membrane showed the highest $CO_2$ permeability of 598 Barrer and moderate $CO_2/CH_4$ selectivity of 19.5 among the four tested membranes.

TABLE 1

Pure Gas Permeation Test Results of PA(APAF-ODBC), PBO(APAF-ODBC-350C), PBO(APAF-ODBC-400C), and PBO(APAF-ODBC-450C) Polymer Membranes for $CO_2/CH_4$ Separation[a]

| Membrane | $P_{CO2}$ (Barrer) | $\alpha_{CO2/CH4}$ |
|---|---|---|
| PA(APAF-ODBC) | 2.42 | 20.0 |
| PBO(APAF-ODBC-350C) | 41.9 | 25.1 |
| PBO(APAF-ODBC-400C) | 78.6 | 21.8 |
| PBO(APAF-ODBC-450C) | 597.6 | 19.5 |

[a]$P_{CO2}$ and $P_{CH4}$ were tested at 50° C. and 690 kPa (100 psig);
1 Barrer = $10^{-10}$ cm$^3$ (STP) · cm/cm$^2$ · sec · cmHg.

Example 7

Preparation of Uv Crosslinked Polybenzoxazole Polymer Membrane from Polybenzoxazole Polymer Membrane PBO(APAF-ODBC-450C) (Abbreviated as Crosslinked PBO(APAF-ODBC-450C))

Cross-linked PBO(APAF-ODBC-450C) polymer membrane was prepared by UV cross-linking the PBO(APAF-ODBC-450C) polymer membrane prepared in Example 5 by exposure to UV radiation using 254 nm wavelength UV light generated from a UV lamp with 1.9 cm (0.75 inch) distance from the membrane surface to the UV lamp and a radiation time of 20 minutes at 50° C. The UV lamp that was used was a low pressure, mercury arc immersion UV quartz 12 watt lamp with 12 watt power supply from Ace Glass Incorporated.

Example 8

$CO_2/CH_4$ Separation Performance of PBO(APAF-ODBC-450C) and Crosslinked PBO(APAF-ODBC-450C) Polymer Membranes The PBO(APAF-ODBC-450C) and crosslinked PBO(APAF-ODBC-450C) polymer membranes were tested for $CO_2/CH_4$ separation under testing temperatures of 50° and 100° C., respectively (Table 2). It can be seen from Table 2 that the cross-linked PBO(APAF-ODBC-450C) polymer membrane showed >50% increase in $CO_2/CH_4$ selectivity compared to the uncrosslinked PBO(BTDA-APAF-450C) membrane for $CO_2/CH_4$ separation.

TABLE 2

Pure Gas Permeation Test Results of PBO(APAF-ODBC-450C) and Crosslinked PBO(APAF-ODBC-450C) Polymer Membranes for $CO_2/CH_4$ Separation[a]

| Membrane | $P_{CO2}$ (Barrer) | $\alpha_{CO2/CH4}$ |
|---|---|---|
| PBO(APAF-ODBC-450C) | 597.6 | 19.5 |
| Crosslinked PBO(APAF-ODBC-450C) | 440.1 | 29.9 |

[a]$P_{CO2}$ and $P_{CH4}$ were tested at 50° C. and 690 kPa (100 psig); 1 Barrer = $10^{-10}$ cm$^3$ (STP) · cm/cm$^2$ · sec · cmHg.

The invention claimed is:

1. A process for making a crosslinked polybenzoxazole membrane comprising subjecting an aromatic poly(o-hydroxy amide) membrane prepared from an aromatic UV crosslinkable poly(o-hydroxy amide) polymer to thermal cyclization in a temperature range of from about 200° to 550° C. under an inert atmosphere followed by UV crosslinking.

2. The process of claim 1 wherein said polybenzoxazole membrane before UV crosslinking comprises repeating units of a formula (I), wherein said formula (I) is represented by:

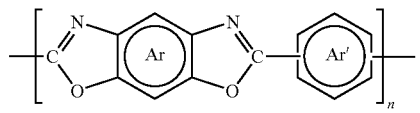

where

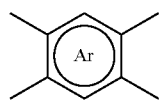

is selected from the group consisting of

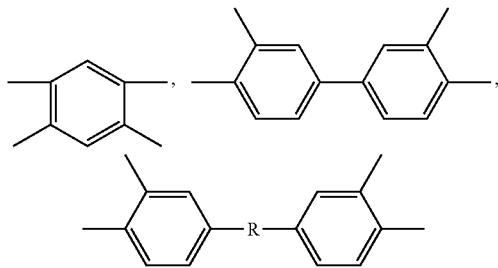

and mixtures thereof, —R— is selected from the group consisting of

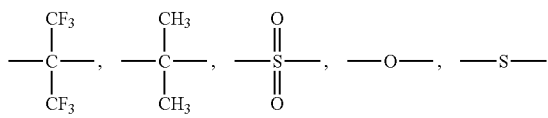

and mixtures thereof, and

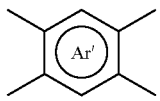

is selected from the group consisting of

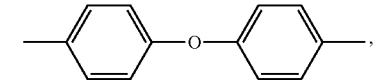

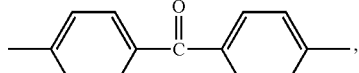

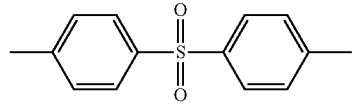

and mixtures thereof.

3. The process of claim 1 wherein said UV crosslinkable poly(o-hydroxy amide) polymer comprises a plurality of first repeating units of a formula (II), wherein formula (II) is:

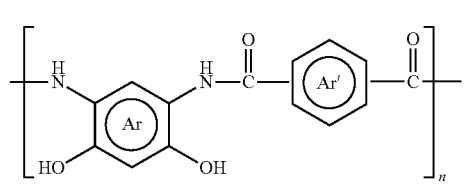

where

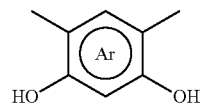

is selected from the group consisting of

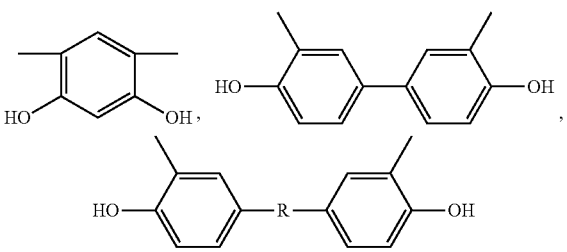

and mixtures thereof, —R— is selected from the group consisting of

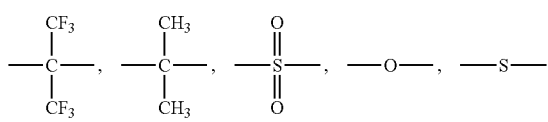

and mixtures thereof, and

is selected from the group consisting of

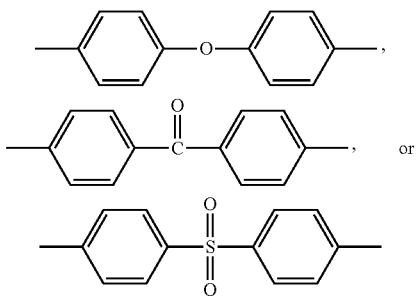

and mixtures thereof.

4. The process of claim 3 wherein said

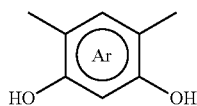

of formula (II) is selected from the group consisting of

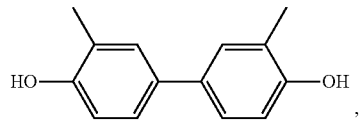

-continued

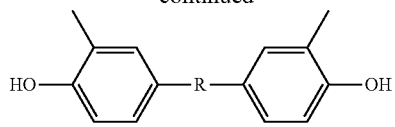

and mixtures thereof and wherein —R— group is represented by the formula:

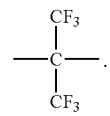

5. The process of claim 1 wherein said UV crosslinkable poly(o-hydroxy amide) polymer comprises

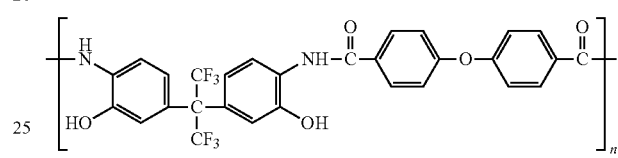

where n is an integer ranging from 15 to 500.

6. The process of claim 1 wherein said UV crosslinkable poly(o-hydroxy amide) polymer comprises

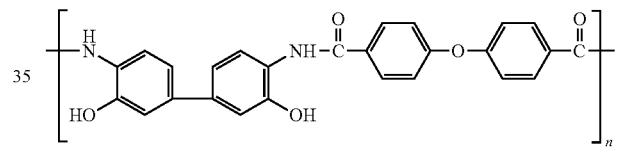

where n is an integer ranging from 15 to 500.

7. The process of claim 1 further comprising coating a selective layer surface of said crosslinked polybenzoxazole membrane with a thin layer of a material selected from the group consisting of a polysiloxane, a fluoro-polymer, a thermally curable silicone rubber or a UV radiation curable epoxy silicone.

8. The process of claim 1 wherein said crosslinked polybenzoxazole membrane is fabricated into a geometry selected from the group consisting of flat sheet, spiral wound, disk, tube, hollow fiber, and thin film composite.

* * * * *